US008028411B2

(12) United States Patent
Ikeda

(10) Patent No.: US 8,028,411 B2

(45) Date of Patent: Oct. 4, 2011

(54) METHOD FOR MANUFACTURING A LIQUID JET HEAD AND A LIQUID JET APPARATUS

(75) Inventor: Hiroki Ikeda, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 439 days.

(21) Appl. No.: 12/356,451

(22) Filed: Jan. 20, 2009

(65) Prior Publication Data

US 2009/0225132 A1 Sep. 10, 2009

(30) Foreign Application Priority Data

Jan. 21, 2008 (JP) ................................. 2008-010104
Dec. 25, 2008 (JP) ................................. 2008-329364

(51) Int. Cl.
*B23P 17/00* (2006.01)

(52) U.S. Cl. ........................................ 29/890.1; 347/47

(58) Field of Classification Search .................... 347/40, 347/43, 47; 29/890.1
See application file for complete search history.

(56) References Cited

U.S. PATENT DOCUMENTS 7,425,052 B2 * 9/2008 Silverbrook .................... 347/40
2007/0226974 A1 10/2007 Li
2009/0122100 A1 * 5/2009 Hida .............................. 347/20

FOREIGN PATENT DOCUMENTS

CN 101045383 A 10/2007
JP 2006-218716 A 8/2006

* cited by examiner

*Primary Examiner* — Lamson Nguyen

(74) *Attorney, Agent, or Firm* — Kilpatrick Townsend & Stockton LLP

(57) ABSTRACT

This manufacturing method includes a passage forming process, in which a liquid passage including at least a pressure generating chamber 12 is formed in a passage forming substrate 10 (110), a first bonding process, in which an adhesive is applied on one side of the passage forming substrate 10, in which the liquid passage opens, so as to form a first adhesion layer 201 and a nozzle plate 120 is bonded by the first adhesion layer 201, and a second bonding process, in which an adhesive is applied on the other side of the passage forming substrate 10 so as to form a second adhesion layer 202 and a compliance substrate 40 is bonded by the second adhesion layer 202, the second bonding process being executed after the first bonding process.

5 Claims, 7 Drawing Sheets

METHOD FOR MANUFACTURING A LIQUID JET HEAD AND A LIQUID JET APPARATUS

The present invention contains subject matter related to Japanese Patent Application No. 2008-010104, filed on Jan. 21, 2008, and Japanese Patent Application No. 2008-329364, filed on Dec. 25, 2008, in the Japanese Patent Office, the entire contents of which are incorporated herein by reference.

BACKGROUND OF THE INVENTION

1. Field of the Invention

The present invention relates to a method of manufacturing a liquid ejecting head, which ejects droplets from nozzles, and a liquid ejecting apparatus, and in particular, to a method of manufacturing an ink jet type recording head, which ejects ink droplets as droplets, and an ink jet type recording apparatus.

2. Description of the Related Art

As a representative example of liquid ejecting heads, which discharge droplets, an ink jet type recording head, which ejects ink droplets, can be cited. In this ink jet type recording head, there is, for example, a portion which is provided with a nozzle plate, in which nozzles are provided, a passage forming substrate, in which a plurality of pressure generating chambers leading to the nozzles and an interconnecting section leading to these pluralities of pressure generating chambers and constituting a part of a reservoir are created, piezoelectric elements, which are pressure generating means formed on one side of this passage forming substrate, a reservoir forming substrate (a protective substrate), which is joined to the passage forming substrate and has a reservoir section constituting the reservoir together with the interconnecting section, and a compliance substrate which is joined to the reservoir forming substrate so as to seal one opening of the reservoir (See, for example, JP-A-2006-218716).

In the ink jet type recording head having such a structure, the nozzle plate and the compliance substrate are bonded to the passage forming substrate or the reservoir substrate, etc., by an adhesive. Though the method thereof is not disclosed clearly in Patent Document 1, generally, the nozzle plate is bonded to the passage forming substrate by an adhesive after the compliance substrate is bonded to the reservoir forming substrate, etc.

If the nozzle plate is bonded to the passage forming substrate after the bonding of the compliance substrate in such a procedure, there is a risk that adhesive failure may be caused by foreign matter adhering to the surface of the passage forming substrate and by this foreign matter being sandwiched between the nozzle plate and the passage forming substrate in the process. Moreover, there is a risk that a protrusion, what is called a protruding mark, may be formed on the surface of the nozzle plate.

If adhesive failure between the nozzle plate and the passage forming substrate arises, there is a risk that adjacent pressure generating chambers may connect with each other because of the space created therebetween and that it may exert a negative influence upon the ejection properties of the ink droplets. On the other hand, once a protrusion is created on the surface of the nozzle plate, there is a risk that a problem, such as adhesive failure or a drop in accuracy in positioning of the head, may arise, for example, in the case of positioning and fixing the ink jet type recording head in a specified position on the nozzle plate face.

Moreover, such problems may similarly occur, of course, not only in a method of manufacturing ink jet type recording heads, which eject ink droplets, but also in a method of manufacturing other liquid ejecting heads, which eject droplets other than ink droplets.

SUMMARY OF THE INVENTION

The present invention has been made in view of such circumstances, and it is an object of the present invention to provide a method of manufacturing a liquid ejecting head, which can prevent the sandwiching of foreign matter between a nozzle plate and a passage forming substrate, and a liquid ejecting apparatus.

The present invention, which solves the above problem, provides a method of manufacturing the liquid ejecting head, which is provided with the nozzle plate, in which nozzles for ejecting droplets are formed, the passage forming substrate, to one side of which the nozzle plate is joined and in which a liquid passage including a plurality of pressure generating chambers leading to at least the nozzles are created, pressure generating means, which exert pressure inside the pressure generating chambers, and a compliance substrate, which has a flexible section that is made of a material that is transformable by a pressure change in the liquid passage, the method of manufacturing the liquid ejecting head, being characterized by including a passage forming process, in which the liquid passage is formed in the passage forming substrate, a first bonding process, in which an adhesive is applied on one side of the passage forming substrate, in which the liquid passage opens, so as to form a first adhesion layer and the nozzle plate is bonded by the first adhesion layer, and a second bonding process, in which an adhesive is applied on the other side of the passage forming substrate so as to form a second adhesion layer and the compliance substrate is bonded by the second adhesion layer, the second bonding process being executed after the first bonding process.

As such, in the present invention, the process of bonding the compliance substrate is executed after bonding the nozzle plate to the passage forming substrate. That is, the nozzle plate is bonded before foreign matter can adhere to the passage forming substrate after the liquid passage is formed in the passage forming substrate. Hereby, the nozzle plate can be bonded to the passage forming substrate extremely well, and also a protrusion can never form on the surface of the nozzle plate.

Here, for example, the liquid ejecting head is further provided with a reservoir forming substrate, which has a reservoir section and is joined to the other side of the passage forming substrate, and the method further includes a joining process, in which the reservoir forming substrate is joined to the other side of the passage forming substrate, before the passage forming process, and in the second bonding process, the compliance substrate is bonded to the reservoir forming substrate joined to the other side of the passage forming substrate thereby sealing one opening of the reservoir section. That is, the compliance substrate may also be fixed to the passage forming substrate via the reservoir forming substrate. Even in the case that the liquid ejecting head has a reservoir forming substrate, the passage forming substrate and the nozzle plate can be bonded satisfactorily to each other.

Moreover, it is desirable to temporarily fix the nozzle plate with the first adhesion layer in the first bonding process, and also, temporarily fix the compliance substrate with the second adhesion layer in the second bonding process, and that the method of manufacturing the liquid ejecting head further includes a hardening process, which hardens the first adhesion layer and the second adhesion layer, after the second bonding process. Hereby, the first and second adhesion layers can be hardened at the same time, simplifying the manufacturing process.

Furthermore, in the hardening process, it is desirable to harden the first adhesion layer and the second adhesion layer in the state of having pressed the nozzle plate and the compliance substrate against the passage forming substrate. Hereby, the nozzle plate, the compliance substrate, and the passage forming substrate can be fixed securely by hardening the first and second adhesion layers satisfactorily.

Moreover, the present invention provides the liquid ejecting apparatus, which is equipped with a liquid ejecting head manufactured by the above manufacturing method. As regards an apparatus according to this invention, since it is equipped with the above liquid ejecting head, a reliable liquid ejecting apparatus, in which the durability of its head has been improved, can be realized.

Passage forming substrate, 10; pressure generating chamber, 12; ink supply path, 13; communicating path, 14; connecting section, 15; nozzle plate, 20; nozzle, 21; reservoir forming substrate, 30; reservoir section, 31; piezoelectric element holder, 32; compliance substrate, 40; elastic film, 50; insulator film, 55; lower electrode film, 60; piezoelectric substance layer, 70; upper electrode film, 80; lead electrode, 90; reservoir, 100; wafer for forming passage forming substrate, 110; wafer for forming reservoir forming substrate, 130; first adhesion layer, 201; second adhesion layer, 202; piezoelectric element, 300.

DESCRIPTION OF THE PREFERRED EMBODIMENTS

The present invention is described in detail on the basis of the embodiments as follows.

Figure 1:
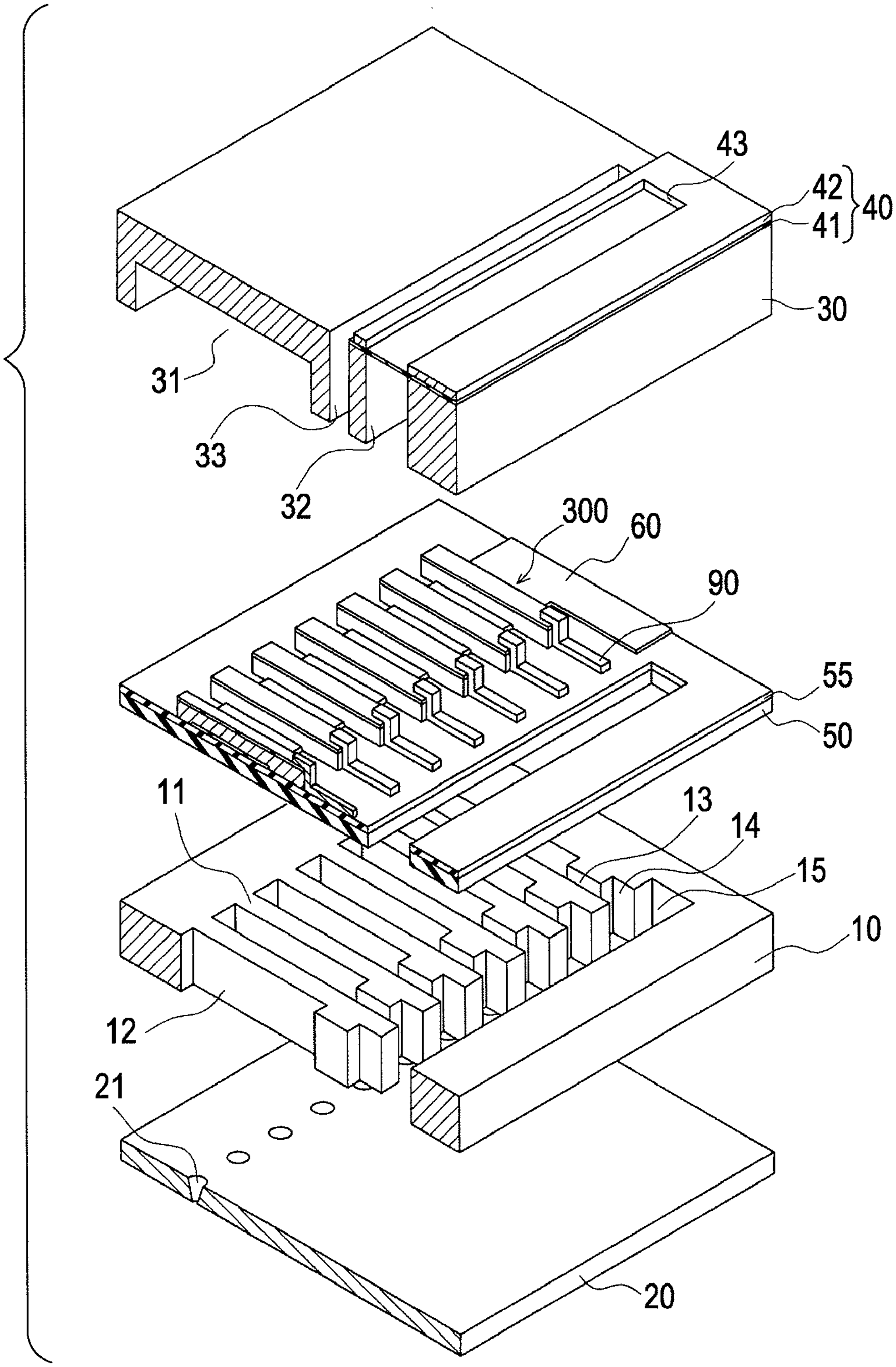
FIG. 1 is an exploded perspective view of a recording head according to an embodiment of the present invention.
Figure 2:
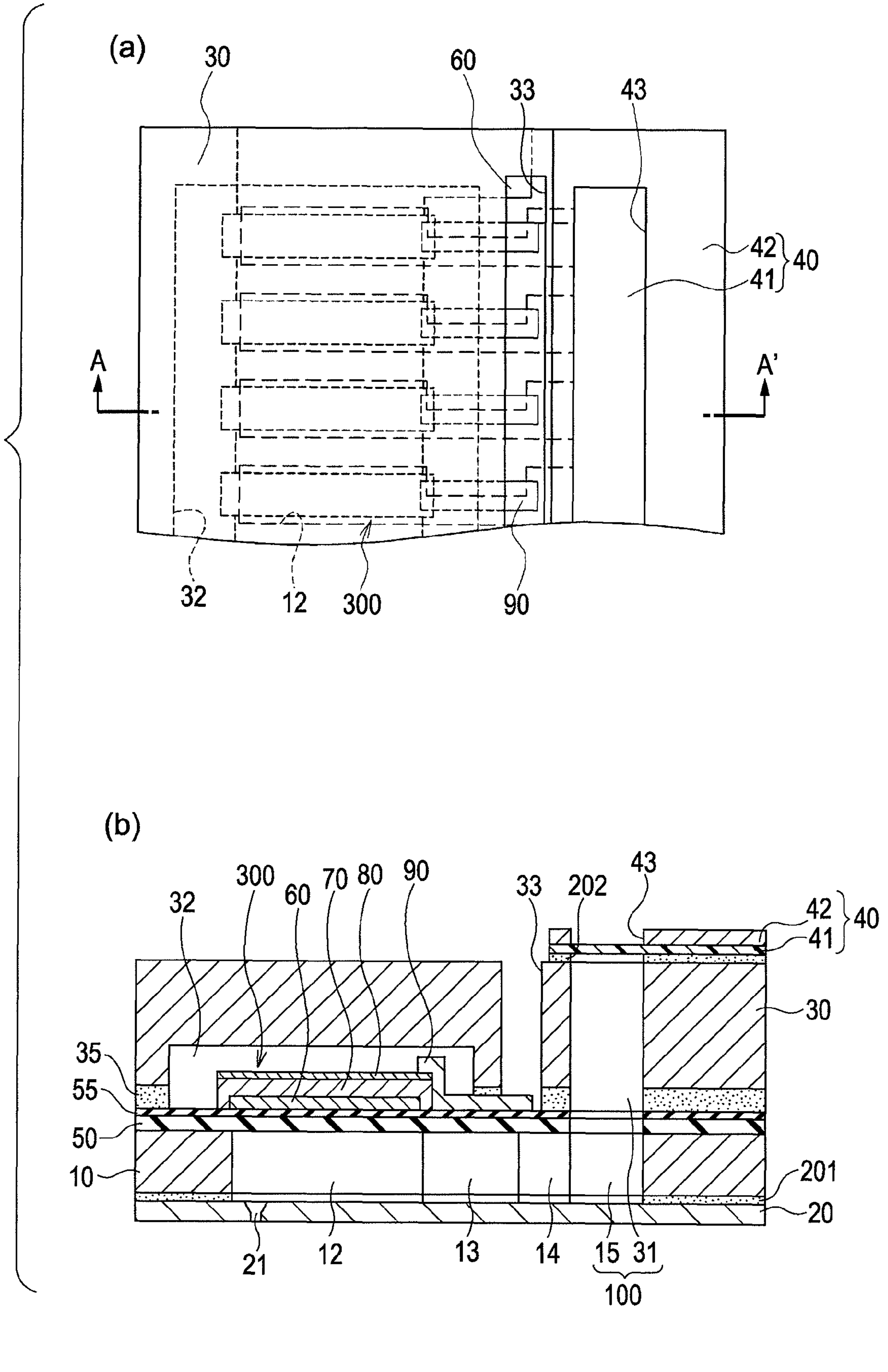
FIG. 2 is a plan view and a sectional view of the recording head according to an embodiment of the present invention.

FIG. 1 shows an exploded perspective view of an ink jet type recording head, which is manufactured by a manufacturing method according to an embodiment of the present invention, and FIG. 2 (*a*) is a plan view of FIG. 1 and FIG. 2 (*b*) is a sectional view along the line A-A' of FIG. 2 (*a*).

As shown in the figures, a passage forming substrate 10 consists of a silicon monocrystalline substrate in which the orientation of its crystal faces is (110) in this embodiment, and an elastic film 50 consisting of an oxide film is formed on one of its sides. In the passage forming substrate 10, a plurality of pressure generating chambers 12, which are partitioned by partition walls 11, are formed adjacent to one another in its width direction. Moreover, it is provided with ink supply paths 13 and communicating paths 14, which lead to respective pressure generating chambers 12, and are partitioned by the partition walls 11 at one end of the pressure generating chambers 12 in the passage forming substrate 10 in the longitudinal direction. Furthermore, it is provided with a connecting section 15, which is connected with each communicating path 14, outside of the communicating paths 14. This connecting section 15 is connected with a reservoir section 31 of a reservoir forming substrate 30 described later, and constitutes a part of a reservoir 100 which serves as an ink chamber (a liquid chamber) common to each pressure generating chamber 12.

Here, each ink supply path 13 is so formed as to be smaller in sectional area than the pressure generating chamber 12, whereby it keeps the passage resistance of ink, which flows into the pressure generating chamber 12 from the connecting section 15, constant. For example, in this embodiment, the ink supply path 13 is made smaller in width than the pressure generating chamber by narrowing, in its width direction, the passage between the reservoir 100 and adjacent pressure generating chambers 12 from one side of the pressure generating chamber 12. Furthermore, though in this embodiment the ink supply path is formed by narrowing the passage from one of its sides, the ink supply path may be formed by narrowing the passage from both of its sides. Moreover, the ink supply path may be formed not by narrowing the passage but by narrowing it in its thickness direction. Each communicating path 14 is formed by extending the partition walls 11 on both sides thereof in the width direction of the pressure generating chamber 12 to the side of the connecting section 15 and partitioning the space between the ink supply path 13 and the connecting section 15.

Though in this embodiment the silicon monocrystalline substrate is used as the material of the passage forming substrate 10, of course, it is not limited to this, and, for example, a glass ceramic or stainless steel, etc. may be used.

A nozzle plate 20, in which a plurality of nozzles 21 are formed, is bonded by a first adhesion layer 201 to the aperture side of the passage forming substrate 10, and each nozzle 21 leads to the vicinity of the end of the pressure generating chamber 12 on the opposite side from the ink supply path 13. This nozzle plate 20 is made of a metallic material, such as stainless steel, etc. Furthermore, the nozzle plate 20 may be made of, for example, a glass ceramic or a silicon monocrystalline substrate, etc., rather than the metallic material.

On the other hand, the elastic film 50 is formed, as mentioned above, on the opposite side of the passage forming substrate 10 from the apertures, and an insulator film 55, consisting of an oxide film of a material different from the elastic film 50, is formed on this elastic film 50. Furthermore, piezoelectric elements 300, which are pressure generating means each composed of a lower electrode film 60, a piezoelectric substance layer 70, and an upper electrode film 80, are formed on this insulator film 55. Here, the piezoelectric element 300 includes not only a section, which has the lower electrode film 60, the piezoelectric substance layer 70, and the upper electrode film 80, but also a section, which has, at least, the piezoelectric substance layer 70. Generally, either electrode in each of the piezoelectric elements 300 is made into a common electrode, and the other electrodes are patterned, together with the piezoelectric substance layers 70, for every pressure generating chamber 12, into individual electrodes. Here, the piezoelectric element 300 and a diaphragm, in which displacement arises due to the driving of the piezoelectric element 300 concerned, are called an actuator as a pair. Furthermore, in the above-mentioned example, the elastic film 50, the insulator film 55, and the under electrode 60 act substantially as the diaphragm, but only the under electrode 60 may be provided and the lower electrode film 60 may be then used as the diaphragm, without providing it with an elastic film 50 nor with an insulator film 55. Moreover, the piezoelectric element 300 may be configured to substantially double as the diaphragm.

Furthermore, lead electrodes 90 made of, for example, gold (Au), etc., are respectively connected to the upper electrodes 80 of such individual piezoelectric element 300, and a voltage is applied selectively to each piezoelectric element 300 via this lead electrode 90.

The reservoir forming substrate 30, which has the reservoir section 31 that constitutes at least a part of the reservoir 100, wherein ink to be supplied to the plurality of pressure generating chambers 12 is held, is fixed onto the passage forming substrate 10, where such piezoelectric elements 300 are formed, by, for example, an adhesion layer 35. In this embodiment, this reservoir section 31 is formed to extend in the width direction of the pressure generating chambers 12, piercing the reservoir forming substrate 30 in its thickness direction, and it constitutes the reservoir 100 and is connected with the connecting section 15 of the passage forming substrate 10 as mentioned above. Furthermore, in the case that the recording head has a reservoir forming substrate 30, the connecting section 15 of the passage forming substrate 10 may be divided into two or more sections for every pressure generating chamber 12, and the reservoir may be only constituted by the reservoir section 31. Furthermore, for example, the passage forming substrate 10 may be provided with only pressure generating chambers 12 and members (for example, the elastic film 50, the insulating film 55, etc.), which are interposed between the passage forming substrate 10 and the reservoir forming substrate 30 may be provided with an ink supply path, which connects the reservoir with each pressure generating chamber 12.

Moreover, the reservoir forming substrate 30 is provided with a piezoelectric element holder 32 for joining the piezoelectric elements 300 thereto. Furthermore, the inside of the piezoelectric element holder 32 may be sealed, or may not be sealed.

For such reservoir forming substrates 30, it is desirable to use a material that has roughly the same coefficient of thermal expansion as the passage forming substrate 10, such as, for example, a glass material or a ceramic material, etc., and so, in particular, a silicon monocrystalline substrate, which is of the same material as the passage forming substrate 10, is preferably used.

Moreover, the reservoir forming substrate 30 is provided with a through hole 33 which pierces the reservoir forming substrate 30 in its thickness direction, and the vicinity of the end of the lead electrode 90 and a part of the lower electrode film 60 led out of each piezoelectric element 300 are exposed through this through hole 33. Though not shown in the figures, these lead electrodes 90 and the lower electrode film 60 are electrically connected to a driving IC, etc., for driving the piezoelectric elements 300 via connecting wiring extended in the through hole 33.

Moreover, a compliance substrate 40, composed of a sealing film 41 and a fixing plate 42, is bonded by a second adhesion layer 202 onto the reservoir forming substrate 30. Here, the sealing film 41 arranged on the side of the reservoir forming substrate 30 is made of a material, which is low in rigidity and is transformable by a pressure change within the reservoir 100, such as, for example, an elastic material. To be concrete, the sealing film 41 is made of, for example, a polyphenylene sulfide (PPS) film having a thickness of 6 μm, etc. The fixing plate 42 is provided to fix the sealing film 41, and it is made of a hard material such as a metal, etc., for example, stainless steel (SUS) with a thickness of 30 μm, etc. The region, opposed to the reservoir 100, of this fixing plate 42 is an opening 43, where material of the plate has been removed completely in the thickness direction, and one side of the reservoir 100 is sealed with only the flexible sealing film 41. In short, the inside of this opening 43 serves as a flexible section which is transformed by a change of internal pressure of the reservoir 100. Then, the inside of the reservoir 100 is kept at a roughly constant pressure by the transformation of this flexible section (the sealing film 41) of the compliance substrate 40.

Furthermore, the compliance substrate 40 need not be provided with a fixing plate 42 and may be constituted of only the sealing film 41, if it can be fixed securely to the reservoir substrate 30.

This kind of ink jet type recording head, in the present embodiment, takes in ink from an ink inlet connected to external ink supply means, not shown in the figures, and fills its inside with ink from the reservoir 100 to the nozzles 21, and then applies a voltage to the individual piezoelectric elements 300 corresponding to the pressure generating chambers 12 and thereby flexurally transforms the piezoelectric elements 300 in accordance with a recording signal from a driving IC not shown in the figures, whereby the pressure within each pressure generating chamber 12 increases, and ink droplets are ejected from the nozzles 21.

The manufacturing method of such an ink jet type recording head is described, referring to FIG. 3 to FIG. 5, as follows. Furthermore, FIG. 3 to FIG. 5 are longitudinal sectional views of pressure generating chambers.

Figure 3:
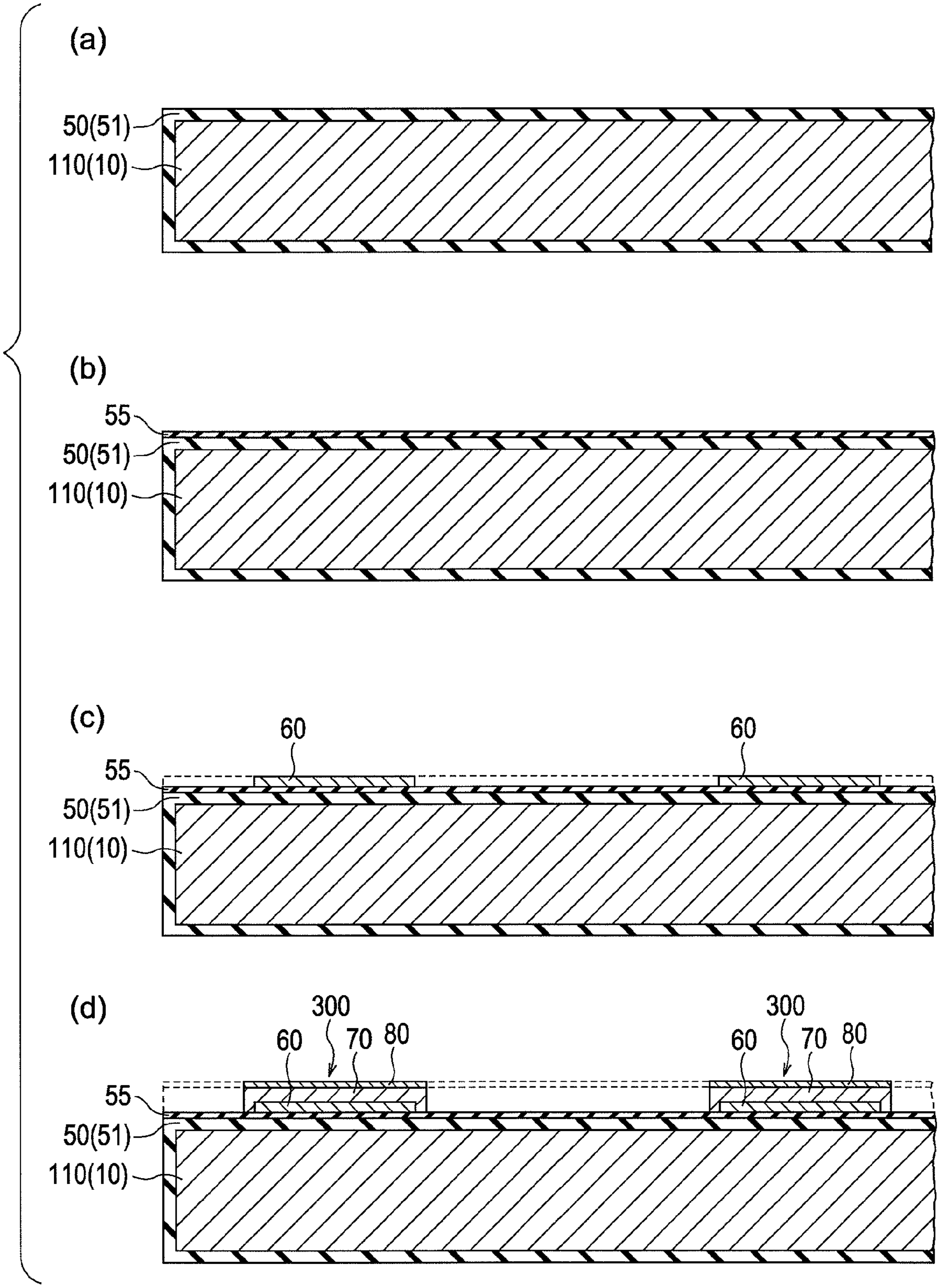
FIG. 3 is a sectional view, which shows the manufacturing process according to an embodiment of the present invention.

First, as shown in FIG. 3 (*a*), an oxide film 51, which constitutes the elastic film 50, is formed on the surface of a wafer 110 for forming passage forming substrates, which is a silicon wafer and in which a plurality of passage forming substrates 10 are to be formed. The method of forming this oxide film 51 is not especially limited, but it is preferably formed by, for example, thermally oxidizing the wafer 110 for forming passage forming substrates in a diffusion furnace, etc. Next, as shown in FIG. 3 (*b*), an insulator film 55 consisting of an oxide film of a material different from the elastic film 50 is formed on the elastic film 50 (the oxide film 51).

Next, as shown in FIG. 3 (*c*), a lower electrode film 60 is formed on the insulator film 55, and then this under electrode film 60 is patterned into the specified form. Next, as shown in FIG. 3 (*d*), a piezoelectric substance layer 70, consisting of, for example, lead zirconate titanate (PZT), etc., and an upper electrode film 80, are formed over the entire surface of the wafer 100 for forming passage forming substrates, and the piezoelectric layer 70 and upper electrode film 80 are patterned in regions opposed to the individual pressure generating chambers 12 so as to form piezoelectric elements 300.

Figure 4:
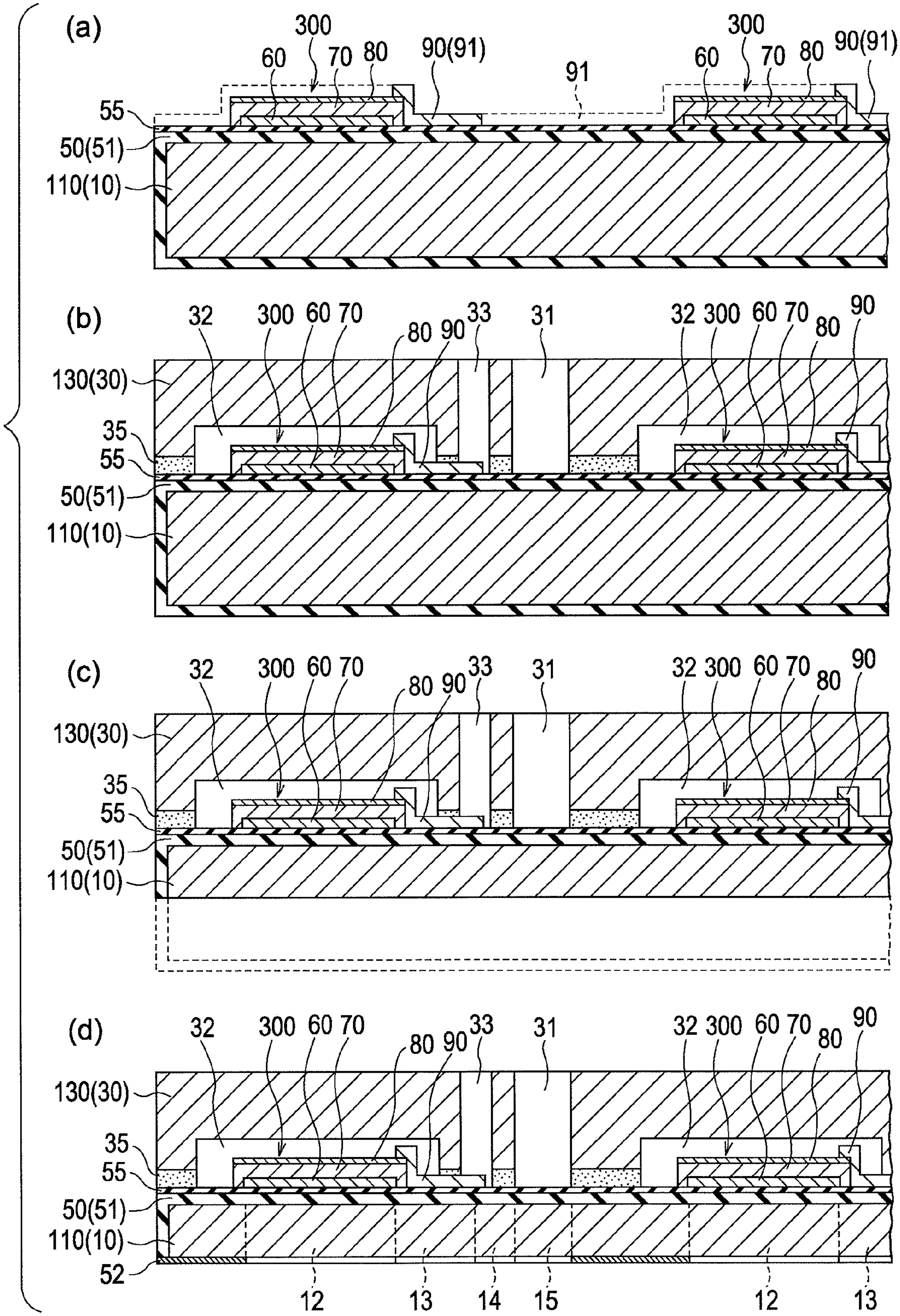
FIG. 4 is a sectional view, which shows the manufacturing process according to an embodiment of the present invention.
Figure 5:
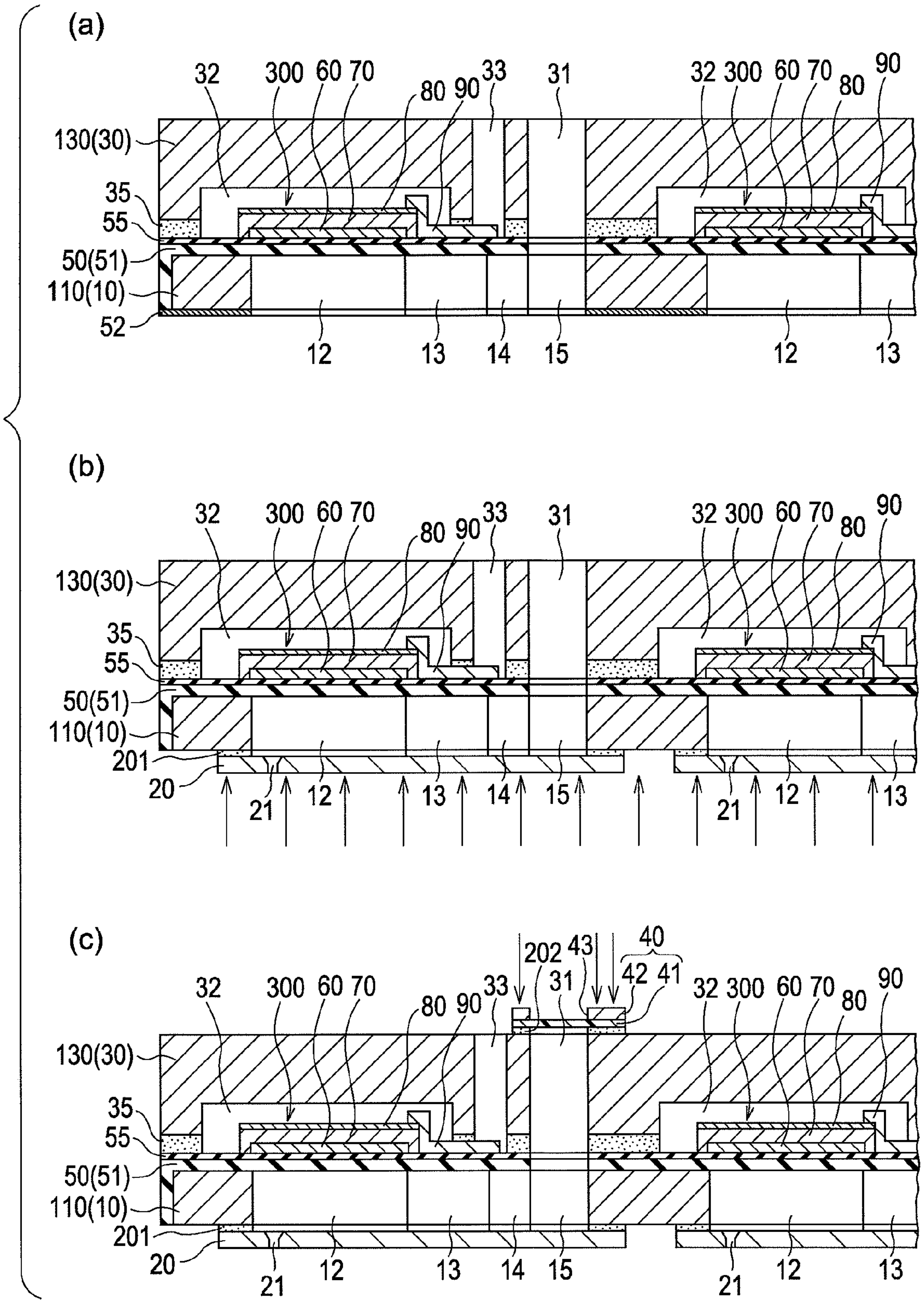
FIG. 5 is a sectional view, which shows the manufacturing process according to an embodiment of the present invention.

Next, as shown in FIG. 4 (*a*), lead electrodes 90 are made. To be concrete, first a metallic layer 91 is formed over the entire surface of the wafer 110 for forming passage forming substrates, and this metallic layer 91 is patterned for every piezoelectric element 300, thereby forming the lead electrodes 90.

Next, as shown in FIG. 4 (*b*), a wafer 130 for forming reservoir forming substrates, which is a silicon wafer, is joined to the piezoelectric elements 300 side of the wafer 110 for forming passage forming substrates (joining process). This method of joining the wafer 130 for forming reservoir forming substrates is not especially limited, but it is preferable to form an adhesion layer 35 consisting of, for example, an epoxy adhesive, etc., and to fix the wafer 130 for forming reservoir forming substrates to the wafer 110 for forming passage forming substrates with this adhesion layer 35. Furthermore, a reservoir section 31, a piezoelectric element holder 32, and a through hole 33 are created in advance in the wafer 130 for forming reservoir forming substrates.

Next, as shown in FIG. 4 (*c*), the opposite side of the wafer 110 for forming passage forming substrates from the wafer 130 for forming reservoir forming substrates is processed to make the wafer 110 for forming passage forming substrates a specified thickness. Next, as shown in FIG. 4 (*d*), a protective film 52, which serves as a mask when creating ink passages such as pressure generating chambers 12, etc., is formed on the surface of the wafer 110 for forming passage forming substrates in a specified pattern. Then, as shown in FIG. 5 (*a*), the wafer 110 for forming passage forming substrates is anisotropically etched (wet-etched), with this protective film 52 acting as a mask, so as to create pressure generating chambers 12, ink supply paths 13, communicating paths 14, and connecting sections 15 in the wafer 110 for forming passage forming substrates. That is, the pressure generating chambers 12, etc., are created at the same time by etching the wafer 110 for forming passage forming substrates, until the elastic film 50 is exposed, by using an etchant, such as, for example, an aqueous solution of potassium hydroxide (KOH), etc. (passage forming process). Moreover, the elastic film 50 and the insulator film 55 are removed to connect the connecting section 15 with the reservoir section 31.

Next, as shown in FIG. 5 (*b*), nozzle plates 20 are joined to the surface on one side of the wafer 110 for forming passage forming substrates, that is, the surface where the pressure generating chambers 12, etc. open. In this embodiment, after the protective film 52 is removed from the surface of the wafer 110 for forming passage forming substrates, an epoxy adhesive is applied to form a first adhesion layer 201, and a plurality of nozzle plates 20, which correspond to individual passage forming substrates 10, are bonded to the wafer 110 for forming passage forming substrates by this first adhesion layer (a first bonding process). To be concrete, the nozzle plates 20 are brought into contact with the first adhesion layer in an unhardened state, and the first adhesion layer 201 is heated and hardened in the state of pressing the nozzle plates 20 with a specified pressure against the wafer 110 for forming passage forming substrates, as shown by arrows in the figure, using a jig, etc.

Next, as shown in FIG. 5(*c*), compliance substrates 40 are bonded to the other side of the wafer 110 for forming passage forming substrates by second adhesion layers 202 (a second bonding process). In this embodiment, the compliance substrates 40 are bonded to the other side of the wafer 110 for forming passage forming substrates by the second adhesion layers 202 with the wafer 130 for forming reservoir forming substrates therebetween. To be concrete, similar to the case of the nozzle plates 20, the compliance substrates 40 are brought into contact with the second adhesion layers 202 in an unhardened state, and the second adhesion layers 202 are heated and hardened in the state of pressing the compliance substrates 40 against the wafer 130 for forming reservoir forming substrates (the wafer 110 for forming passage forming substrates) with a specified pressure by a jig, etc.

Hereby, the nozzle plates 20 can be satisfactorily fixed to the wafer 110 for forming passage forming substrates and also the compliance substrates 40 can be satisfactorily fixed to the wafer 130 for forming reservoir forming substrates. In particular, since the first bonding process for bonding the nozzle plates 20 to the wafer 110 for forming passage forming substrates is executed before the second bonding process for bonding the compliance substrates 40 to the wafer 130 for forming reservoir forming substrates, that is, immediately after the passage forming process for creating the ink passages, such as the pressure generating chambers 12, etc., in the wafer 110 for forming passage forming substrates, the nozzle plates 20 can be satisfactorily bonded to the wafer 110 for forming passage forming substrates by the first adhesion layers 201, in a state that foreign matter has not adhered to the surface of the wafer 110 for forming passage forming substrates.

Accordingly, a better ejection property can be obtained, without forming a space between the nozzle plates 20 and the wafer 110 for forming passage forming substrates such that adjacent pressure generating chambers 12 communicate with each other through this space. Moreover, a protrusion, called a protruding mark, never forms on the surface of each nozzle plate 20. Accordingly, each head can be positioned and fixed accurately, even in the case of positioning and fixing a plurality of ink jet type recording heads on the surfaces of the nozzle plates 20.

Furthermore, for example, in the case that the nozzle plates 20 are made of materials such as monocrystalline silicon substrates, problems, such as the above protrusions forming on the surfaces of the nozzle plates, do not occur, but problems, such as the above space forming, occur. That is, the manufacturing method of this invention is effective irrespective of which material the nozzle plates 20 are made of.

On the other hand, the compliance substrates 40 can also, of course, be satisfactorily fixed, to the wafer 130 for forming reservoir forming substrates, by the second adhesion layers 202. In connection to this, though there is such a case that a little foreign matter has adhered to the surface of the wafer 130 for forming reservoir forming substrates, when bonding the compliance substrates 40 to the wafer 130 for forming reservoir forming substrates, the face, on the side of the wafer 130 for forming reservoir forming substrates, of each compliance substrate 40 is constituted of a sealing film 41, which is made of a material that has flexibility of a type allowing it to be transformable by a pressure change within the reservoir 100. Accordingly, even in the case that a little foreign matter adheres to it, the compliance substrate 40 can be satisfactorily fixed to the wafer 130 for forming reservoir forming substrates in a state that this sealing film 41 is transformed. That is, a problem of ink leakage, etc., which is caused by a space being formed between the wafer 130 for forming reservoir forming substrates and the compliance substrates 40 and the reservoirs 100 leading to outside, never occurs.

Furthermore, after that, the unneeded sections of the peripheral edges of the wafer 110 for forming passage forming substrates and the wafer 130 for forming reservoir forming substrates are cut off by, for example, dicing, etc., thereby being removed, and these wafers 110 for forming passage forming substrates and wafers 130 for forming reservoir forming substrates, etc., are divided into passage forming substrates 10, etc., of one chip size as shown in FIG. 1, whereby ink jet type recording heads of the structure described above are manufactured.

Though one embodiment of the present invention is described above, the present invention is not limited to the above-described embodiment. For example, in the above-described embodiment, the second bonding process is executed after heating and hardening the first adhesion layer 210 in the first bonding process, but it is not limited to this. For example, the nozzle plates 20 may be kept in contact with the first unhardened adhesion layers 201 in the first bonding process and the compliance substrates 40 may be kept in contact with the second unhardened adhesion layers 202 in the second bonding process, and then, the hardening process for hardening these first and second adhesion layers 201 and 202 may be executed. Even in this case, similar to the case of the above-mentioned embodiment, the nozzle plates 20 and the compliance substrates 40 can be satisfactorily fixed to the passage forming substrates 10 (the wafer 110 for forming passage forming substrates).

Figure 6:
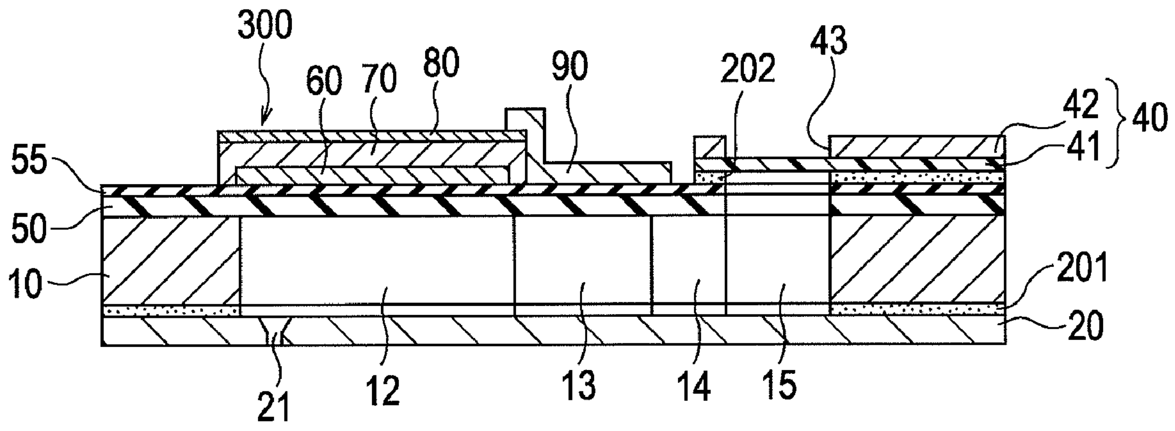
FIG. 6 is a sectional view which shows a modification of the recording head of the present invention.

Moreover, though in the above-mentioned embodiment, the ink jet type recording head provided with the reservoir forming substrate 30 is exemplified by way of example, this invention is not limited to ink jet type recording heads provided with the reservoir forming substrates 30, but is also applicable to ink jet type recording heads not provided with the reservoir forming substrates 30. For example, the ink jet type recording head may have such a structure that only the connecting section 15 functions as a reservoir 100 and the compliance substrate 40 is bonded onto the passage forming substrate 10 (the insulator film 55) by the second adhesion layer 202, as shown in FIG. 6.

Figure 7:
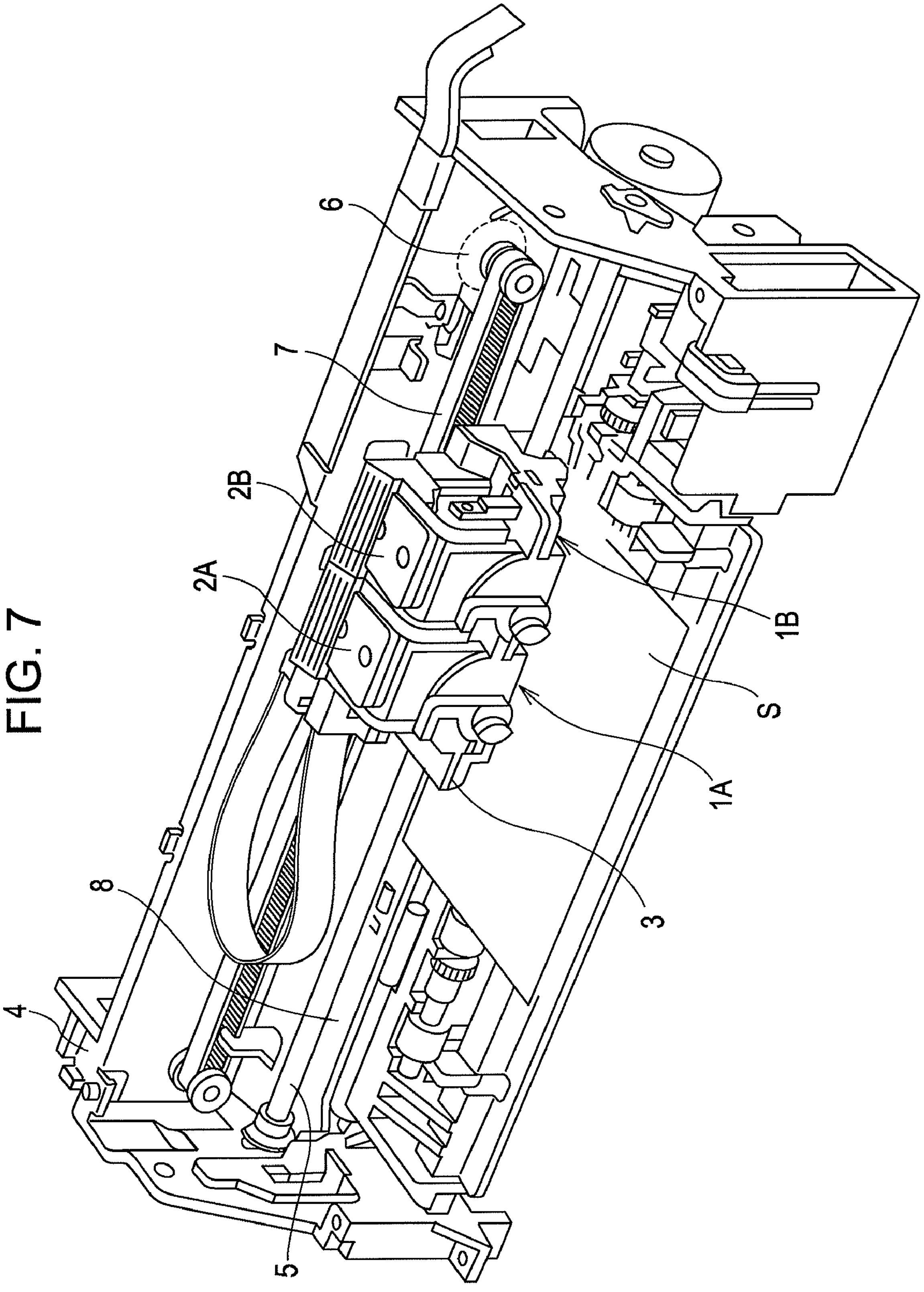
FIG. 7 is a schematic diagram of a recording apparatus according to an embodiment of the present invention.

Moreover, the ink jet type recording head in the above-mentioned embodiment constitutes a part of a recording head unit, which is provided with an ink passage interconnecting with an ink cartridge, etc., and is mounted on an ink jet type recording apparatus, which becomes an example of a liquid ejecting apparatus. FIG. 7 is a schematic diagram which shows an example of such an ink jet type recording apparatus. As shown in FIG. 7, for recording head units 1A and 1B, which have ink jet type recording heads, cartridges 2A and 2B, which constitute ink supply means, are provided detachably, and a carriage 3, on which these recording head units 1A and 1B are mounted, is provided so as to be axially shiftable on a carriage shaft 5, which is attached to the main body 4 of the apparatus. These recording head units 1A and 1B discharge, for example, a black ink composition and a color ink composition, respectively. The carriage 3, on which the recording head units 1A and 1B are mounted, is moved along the carriage shaft 5 by the driving force of a drive motor 6 transmitted to the carriage 3 via a plurality of gears and a timing belt 7 not shown in the figure. On the other hand, the main body 4 of the apparatus is provided with a platen 8 parallel to the carriage shaft 5, and it is arranged so that a recording sheet S, being a recording medium, such as paper, etc., fed by a paper feed roller, etc., not shown in the figure, may be transported along the platen 8.

Furthermore, though the ink jet type recording apparatus is shown as an example of a serial type liquid ejecting apparatus in FIG. 7, the present invention is also applicable to an ink jet type recording apparatus (a line printer) that is an example of a line head type liquid ejecting apparatus.

Furthermore, in the above-mentioned embodiment, the ink jet type recording head is cited and described as an example of a liquid ejecting head, but the present invention may be widely applied to general liquid ejecting heads, and, of course, is also applicable to a method of manufacturing a liquid ejecting head which ejects droplets other than ink droplets. As for other liquid ejecting heads, various recording heads, which are used for image recording apparatuses such as printers, etc., color material ejecting heads, which are used for manufacture of color filters in liquid crystal displays, etc., electrode material ejecting heads, which are used for formation of electrodes in organic EL displays or FED's (field emission displays), etc., and bio-organic matter ejecting heads, etc., which are used for the manufacture of biochips, can be cited. The liquid ejecting apparatuses in which these liquid ejecting heads are mounted are not limited to only the ink jet type recording apparatuses, and they are also applicable to the liquid ejecting apparatuses which eject liquids other than ink.

What is clamed is:

1. A method of manufacturing a liquid ejecting head, which is provided with a nozzle plate, in which nozzles for ejecting droplets are formed, a passage forming substrate, to one side of which the nozzle plate is joined and in which a liquid passage, including a plurality of pressure generating chambers leading to, at least, the nozzles, is created, pressure generating means, which exert pressure inside the pressure generating chambers, and a compliance substrate, which has a flexible section that is made of a material that is transformable by a pressure change in the liquid passage, the method of manufacturing the liquid ejecting head, being characterized by comprising a passage forming process, in which the liquid passage is formed in the passage forming substrate, a first bonding process, in which an adhesive is applied on one side of the passage forming substrate, in which the liquid passage opens, so as to form a first adhesion layer and the nozzle plate is bonded by the first adhesion layer, and a second bonding process, in which an adhesive is applied on the other side of the passage forming substrate so as to form a second adhesion layer and the compliance substrate is bonded by the second adhesion layer, the second bonding process being executed after the first bonding process.

2. The method, as defined in claim 1, for manufacturing the liquid ejecting head, which is further provided with a reservoir forming substrate that has a reservoir section and is joined to the other side of the passage forming substrate, the method being characterized by further comprising a joining process, in which the reservoir forming substrate is joined to the other side of the passage forming substrate, before the passage forming process, and the compliance substrate is bonded to the reservoir forming substrate joined to the other side of the passage forming substrate, thereby sealing one opening of the reservoir section, in the second bonding process.

3. The method, as defined in claim 1, for manufacturing the liquid ejecting head, characterized by temporarily fixing the nozzle plate by the first adhesion layer in the first bonding process, and also, by temporarily fixing the compliance substrate by the second adhesion layer in the second bonding process, and further, by comprising a hardening process, in which the first adhesion layer and the second adhesion layer are hardened, after the second bonding process.

4. The method, as defined in claim 3, for manufacturing the liquid ejecting head, characterized by hardening the first adhesion layer and the second adhesion layer in the state of pressing the nozzle plate and the compliance substrate against the passage forming substrate in the hardening process.

5. A liquid ejecting apparatus, which is equipped with a liquid ejecting head manufactured by the manufacturing method as defined in claim 1.

* * * * *